July 18, 1950 — P. F. HACKETHAL — 2,515,996
PROPELLER BLADE MOUNTING
Filed April 29, 1942 — 2 Sheets-Sheet 1
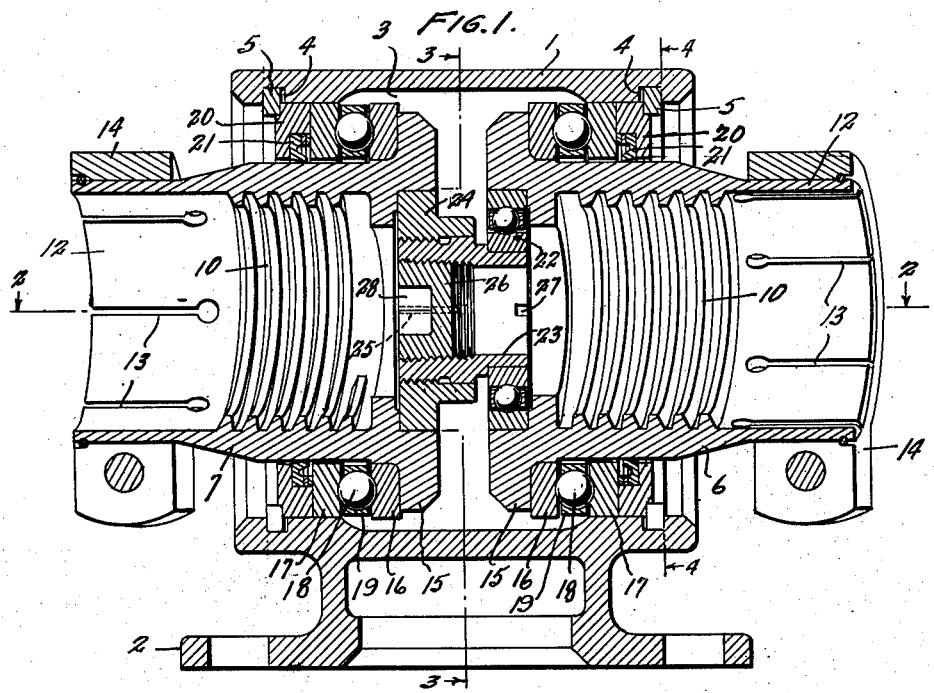
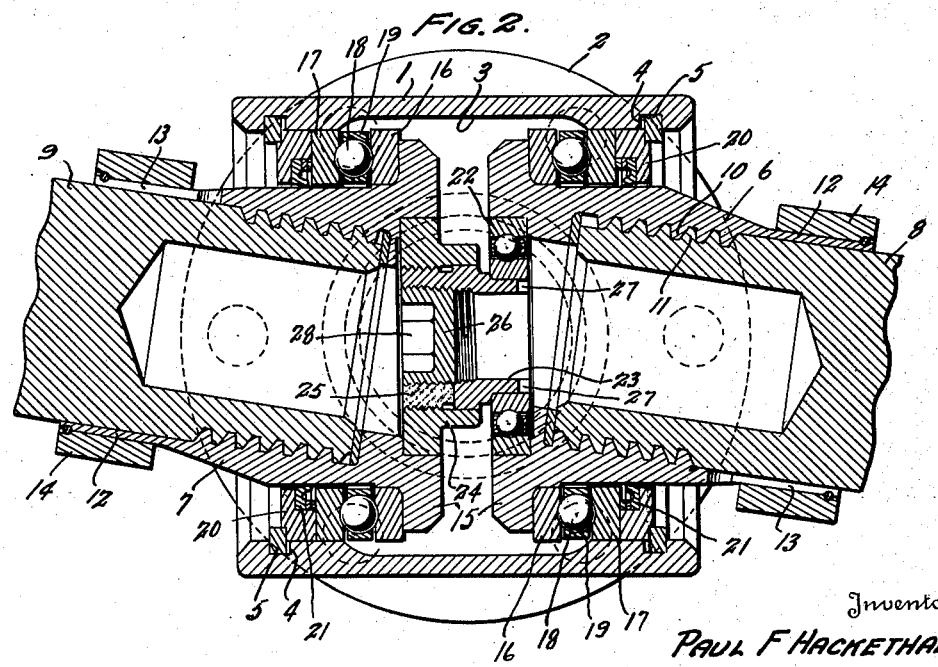
Inventor
PAUL F HACKETHAL
By Semmes, Keegin, Beale & Semmes
Attorneys July 18, 1950     P. F. HACKETHAL     2,515,996
PROPELLER BLADE MOUNTING
Filed April 29, 1942     2 Sheets—Sheet 2
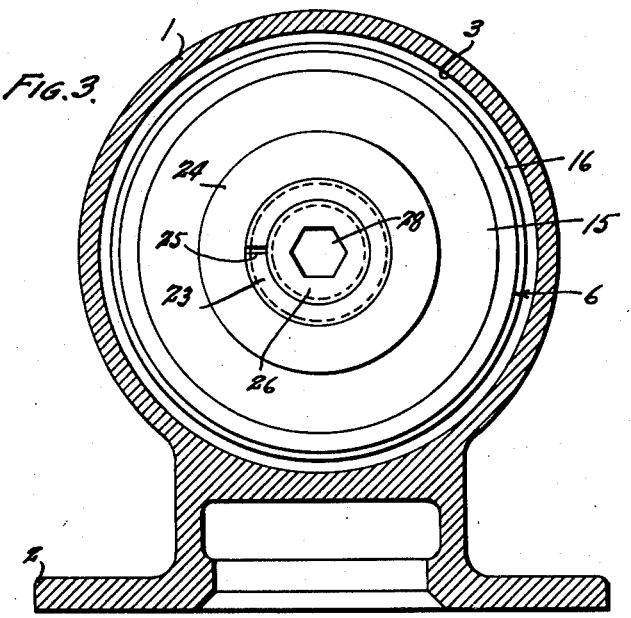
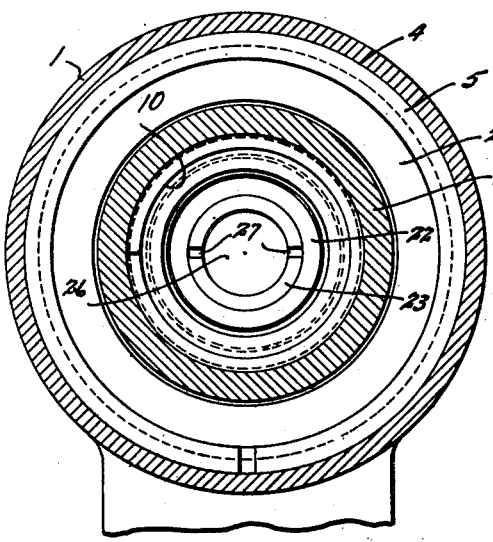
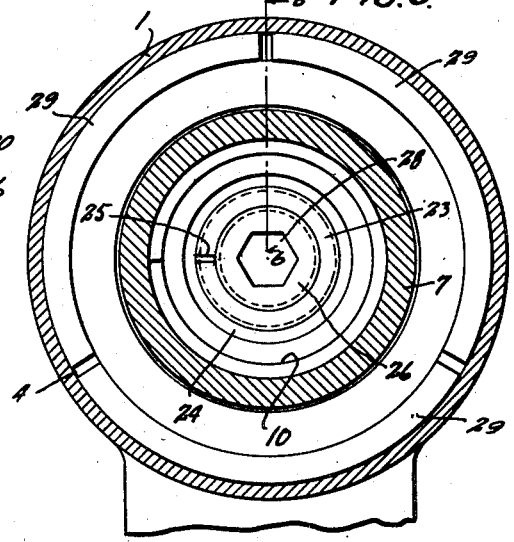
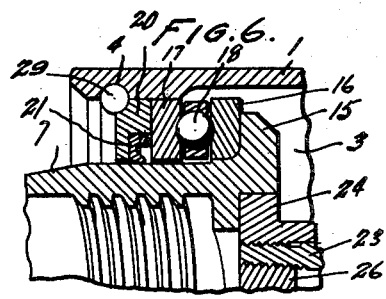
Inventor
PAUL F. HACKETHAL
By Semmes, Keegin, Beale & Semmes
Attorneys Patented July 18, 1950

2,515,996

UNITED STATES PATENT OFFICE 2,515,996

PROPELLER BLADE MOUNTING

Paul F. Hackethal, Cockeysville, Md., assignor to Everel Propeller Corporation, Baltimore, Md., a corporation of Maryland Application April 29, 1942, Serial No. 440,999

8 Claims. (Cl. 170—160.62)

This invention relates to propellers and more particularly has reference to the hub construction of a multi-blade variable pitch propeller.

A number of variable pitch propellers have been made in which the blades are mounted for rotary movement within the hub. In many instances a plurality of bearing elements are provided for the mounting of sleeves carrying propeller blade shanks in sockets formed in the hub. In most of the prior art constructions, however, a plurality of bearing elements are required which increases the weight and cost of the propeller construction. Developments have been made in which the sleeves carrying the shanks of the propeller blades are rotatably mounted within sockets in the propeller hub employing a single bearing. Some difficulty has been encountered in properly positioning the bearing in the hub and in assembling the structure. Also, the loading of the anti-friction bearings has not been satisfactory due to the separate external adjustable means for retaining the bearings and the sleeves in the sockets therefor.

An object of the present invention is to devise a propeller hub construction which avoids the above pointed out disadvantages.

Another object of this invention is to provide a propeller construction in which a plurality of blade-shank-receiving sleeves are mounted in sockets formed in the propeller hub, blocking means are associated with the sockets to prevent outward movement of the sleeves, thrust bearings are positioned between the blocking means and portions of the sleeves, and means are provided for equally pre-loading the bearings.

Another object of this invention is to provide a propeller construction in which a plurality of propeller blade-shank-receiving sleeves are rotatably mounted in sockets formed in a hub and pre-loaded bearings are interposed between the sleeves and blocking means carried by the sockets to prevent outward movement of the sleeves from the sockets.

Still another object of this invention is to provide a simplified construction in which sleeves carrying propeller blade-shanks may be simply and effectively mounted for rotation within sockets provided in a propeller hub.

With these and other objects in view, the present invention comprises the parts and combinations herein described and illustrated in the accompanying drawings.

In the drawings:

Figure 1 is an axial sectional view through the hub of a propeller hub constructed in accordance with the present invention.

Figure 2 is in the line of 2—2 of Figure 1.

Figure 3 is still another sectional view taken on line 3—3 of Figure 1.

Figure 4 is a further sectional view taken on line 4—4 of Figure 1.

Figure 5 is a view similar to that of Figure 4 illustrating a modified form of the invention.

Figure 6 is a fragmentary detailed sectional view taken on line 6—6 of Figure 5.

As shown in the drawings, a rotary driving member or hub 1 is provided with a flange 2 for connection with a drive shaft of an engine. The rotary driving member or hub 1 has a bore 3 extending diametrically or transversely of the axis of rotation thereof. This bore 3 is shown in the figures of the drawing as being enlarged intermediate its ends but if desired, it may have the same diameter throughout its extent.

Bore 3 serves as sockets to receive sleeves in which the propeller blade shanks are mounted. Adjacent each end of the bore, annular grooves 4 are provided. These grooves are adapted to receive split resilient rings 5 which form part of the blocking means as will be hereinafter described.

Mounted in each end of the bore 3 are sleeves 6 and 7 which are adapted to receive the shanks 8 and 9 of propeller blades. For this purpose, the sleeves are provided with internal threads 10 which cooperate with threaded portions 11 of the shanks 8 and 9. The outer ends of the sleeves 6 and 7 are provided with cuffs 12 having a plurality of axially extending slits 13 and about which extend clamping elements 14 which, after the propeller blades have been threaded into the sleeves, serve to clamp the same into the said sleeves against relative rotation.

As will be noted from the drawings, the inner ends of the sleeves 6 and 7 are provided with outwardly extending flanges 15 surrounding the cylindrical portions of the sleeves. Positioned on the sleeves in juxtaposition to the circumferential flanges 15 are anti-friction bearing members which comprise an inner race 16, an outer race 17, and a series of balls 18 carried in a retaining ring 19 and interposed between the races 16 and 17. These anti-friction bearing means are of the thrust type and are designed to prevent outward radial movement of the sleeves 6 and 7 from their sockets which are formed by the bore 3.

Interposed between the outer race 17 of the bearing means and the split ring 5 is an annular member 20 which is of an external diameter substantially equal to that of the portion of the bore 3 adjacent the ends thereof. The inner diameter of said annular member 20 is slightly larger than that of the sleeves 8 and 9 and sealing means in the form of a leather washer or another suitable element 21 is carried by the inner portion of said annular member 20 to effect a seal between the annular member 20 and the sleeves 6 and 7.

It will be noted that adjacent the outer end of the annular member 20 its external diameter is reduced to form a shoulder which receives and cooperates with the split ring 5 to retain said split ring in the groove 4.

Since in rotation there is considerable centrifugal force exerted on the blades of the propeller, the primary force to be considered in connection with the mounting of the sleeves 6 and 7 in the sockets provided therefor is that of radial outward movement. Consequently, during rotation the flange 15 of the sleeves will compress the anti-friction bearing between the same and the annular member 20 which is retained against outward movement by the split ring 5.

It is desirable, however, that said bearing be loaded at all times, even when the propeller is stationary. For this purpose, the present invention provides means between the inner ends of the sleeves 6 and 7 for mutually forcing said sleeves outwardly away from each other and thereby maintaining a load on the anti-friction bearings at all times. As shown in the drawings, the inner end of the sleeve 6 is provided with a recessed portion to receive an anti-friction bearing 22 which in turn receives the reduced end of an internally and externally threaded tubular member 23.

The inner end of the sleeve 7 is recessed to receive an annular internally threaded annular member 24 which receives the externally threaded portion of the tubular member 23. As clearly shown in the drawings, the threaded portion of the tubular member 23 is provided with an axial slit 25 to render the same radially or circumferentially resilient. Mounted within the internally threaded portion of the tubular member 23 is a plug 26. This plug is of tapered formation and the internally threaded portion of the tubular member 23 is of similar formation so that when said plug 26 is threaded into the tubular member 23, the slit threaded portion of the latter will be expanded. This serves to lock or fix the tubular member 23 and the annular member 24 against relative rotation.

In assembling the hub and sleeve construction as illustrated in the drawings, the anti-friction bearing means are positioned on the sleeves together with the annular members 20 and the sleeves with the associated members are then inserted into each end of the bore 3. The tubular member 23 is screwed into the annular member 24 sufficiently to draw the sleeves 6 and 7 together to permit the split rings 5 to be easily inserted in position in the grooves 4 provided in the bore 3. After positioning the sleeves 6 and 7 in the bore 3 and mounting the split rings 5 in place, the tubular member 23 and the annular member 24 are unscrewed to such an extent as to exert a predetermined outward opposing force on the inner ends of the sleeves which tends to equally pre-load the anti-friction bearings interposed between the flanges 15 of the sleeves 6 and 7 and the means for blocking outward movement of the sleeves from the sleeve sockets or ends of the bore 3. After this adjustment has been made, then the plug 26 is screwed into the tubular member 23 to enable the threaded portion of the said tubular member to expand into tight engagement with annular member 24 so that said members will be locked against relative rotation. To facilitate adjustment of the tubular member 23, it is provided with a slot 27 and for adjusting the position of the plug 26, the latter is provided with a hexagonal socket 28.

Instead of the split ring 5, it is also within the concept of the present invention to employ a segmental ring to retain the annular member 20 within the ends of the bore. As shown in Figure 5 of the drawings, a ring of three or more segmental parts 29 may be inserted in the grooves 4 in the inner walls of the bore 3. While a three part ring will not of its own volition be maintained within the grooves 4 in the wall of the bore, nevertheless, after such a member has been assembled and pressure exerted on the inner ends of the sleeves to load the bearings, the annular members 20 will have their reduced portions enter into engagement with the inner peripheral portions of said segmental ring members and thereby serve to retain the latter within the grooves 4 in the wall of the bore 3.

It will be appreciated from the foregoing description that the present invention provides a simple propeller hub construction in which the parts may be easily and effectively assembled and in which the anti-friction bearing means carrying the outward thrust due to centrifugal force in rotation of the propeller are equally pre-loaded. By pre-loading the anti-friction bearings which carry the outward thrust of the propeller blades during rotation of the propeller, the deflections between the rotary parts of the blade-shank-carrying sleeves and the sockets in which they are mounted are greatly reduced so that the life of the anti-friction bearings and the other movable parts of the propeller hub assembly are greatly increased.

I claim:

1. In a propeller having a plurality of blades, a rotary driving element having blade-shank-receiving sockets formed therein, blade-shank-receiving sleeves mounted in said sockets, thrust-bearing means carried by said sleeves, blocking means engaging said bearing means for limiting outward displacement of the sleeves from said sockets, threadedly interengaged adjustably expansible means extending between the sleeves and equally urging said sleeves outwardly of said sockets to equally pre-load said bearing means, and means for fixing said expansible means in adjusted positions.

2. In a propeller having a plurality of blades, a rotary driving element having blade-shank-receiving sockets formed therein, blade-shank-receiving sleeves mounted in said sockets, peripheral flanges on said sleeves, anti-friction bearing means on said sleeves in engagement with said flanges, means engaging said bearing means to block outward displacement of the sleeves from said sockets, an internally screw threaded element engaging the inner portion of one sleeve, and an externally screw threaded element engaging the inner portion of another sleeve, said screw threaded elements being interengaged and equally urging the sleeves associated therewith outwardly of their sockets to equally pre-load the bearing means on said sleeves.

3. In a propeller having a plurality of blades, a rotary driving element having blade-shank-receiving sockets formed therein, blade-shank-receiving sleeves mounted in said sockets, peripheral flanges on said sleeves, anti-friction bearing means on said sleeves in engagement with said flanges, means engaging said bearing means to block outward displacement of the sleeves from said sockets, an internally screw threaded element engaging the inner portion of one sleeve, an externally screw threaded element engaging the inner portion of another sleeve, said screw threaded elements being interengaged and equally urging the sleeves associated therewith outwardly of their sockets to equally pre-load the bearing means on said sleeves, and means for locking the interengaged screw threaded elements in adjusted positions.

4. A propeller comprising a rotary driving member having a bore extending diametrically therethrough transversely of the axis of rotation, a blade-shank-receiving sleeve positioned in each end of said bore, anti-friction bearing means mounted on each sleeve and fixed thereon against relative inward axial movement, blocking means associated with the end portions of said bore to engage said bearing means and block outward movement of said sleeves adjustably expansible, means connecting the inner portions of each sleeve for forcing the sleeves outwardly and urging the bearing means against the blocking means with equal predetermined force, said bore having an annular groove in its wall adjacent each end thereof and said blocking means being in the form of a split ring mounted in said groove and extending radially inwardly of said bore.

5. A propeller comprising a rotary driving member having a bore extending diametrically therethrough transversely of the axis of rotation, a blade-shank-receiving sleeve positioned in each end of said bore, anti-friction bearing means mounted on each sleeve and fixed thereon against relative inward axial movement, blocking means associated with the end portions of said bore to engage said bearing means and block outward movement of said sleeves adjustably expansible means connecting the inner portions of each sleeve for forcing the sleeves outwardly and urging the bearing means against the blocking means with equal predetermined force, said bore having an annular groove in its wall adjacent each end thereof, said blocking means comprising an annular member having an external diameter substantially equal to that of the bore with a portion of reduced external diameter at its outer end, and ring segments positioned in said grooves and retained therein by the reduced outer end of the annular member.

6. A propeller comprising a rotary driving member having a bore extending diametrically therethrough transversely of the axis of rotation, a blade-shank-receiving sleeve positioned in each end of said bore, anti-friction bearing means mounted on each sleeve and fixed thereon against relative inward axial movement, blocking means associated with the end portions of said bore to engage said bearing means and block outward movement of said sleeves, an internally threaded member carried by the inner portion of one sleeve, an externally threaded member carried by the inner portion of the other sleeve, said threaded members being threadedly connected and adjusted for forcing the sleeves outwardly and urging the bearing means against the blocking means with equal predetermined force.

7. In a propeller having a plurality of blades, a rotary driving element having blade shank receiving sockets formed therein, blade shank receiving sleeves mounted in said sockets, peripheral flanges on said sleeves, anti-friction bearing means on said sleeves in engagement with said flanges, means fixed at a predetermined distance from the axis of said rotary driving element and cooperating with the flanges for blocking outward displacement of the blades from the sockets and means interposed between the inner ends of said blade shanks for pressing the blade shanks radially outwardly, said last mentioned means including a part engaging the inner end of one blade shank, a part including an anti-friction bearing engaging the inner end of another blade shank, means for adjusting said parts relative to each other to vary the pressure exerted thereby on the inner ends of said blades, and means for fixing said parts in their adjusted positions.

8. An adjustable variable pitch air screw comprising a hub provided with means for mounting it upon a drive shaft for rotation about the axis of the drive shaft, said hub being provided with radial recesses, a blade receiving sleeve freely rotatably mounted in each of said recesses, a blade having its shank mounted in each of said sleeves, cooperating means on each sleeve and the hub for limiting outward movement of each of said sleeves in the recess in which it is mounted, expansible means interposed between the inner portions of said sleeves and engaging said sleeves for pressing the same radially outwardly of said recesses, said expansible means including cooperating elements adjustable relatively to each other, and means for fixing said elements relative to each other in adjusted positions.

PAUL F. HACKETHAL.

REFERENCES CITED

The following references are of record in the file of this patent:

UNITED STATES PATENTS

| Number | Name | Date |
|---|---|---|
| 1,849,012 | Lougheed | Mar. 8, 1932 |
| 1,907,504 | Chilton | May 9, 1933 |
| 1,956,055 | Wiegand | Apr. 24, 1934 |
| 1,973,573 | Lougheed | Sept. 11, 1934 |
| 2,109,696 | Hackethal | Mar. 1, 1938 |

FOREIGN PATENTS

| Number | Country | Date |
|---|---|---|
| 476,972 | Great Britain | Dec. 20, 1937 |
| 485,102 | Great Britain | May 13, 1938 |
| 486,614 | Great Britain | June 8, 1938 |
| 727,628 | France | June 21, 1932 |